No. 609,742. Patented Aug. 23, 1898.
E. W. HANES.
BICYCLE BRAKE.
(Application filed Oct. 18, 1897.)
(No Model.)
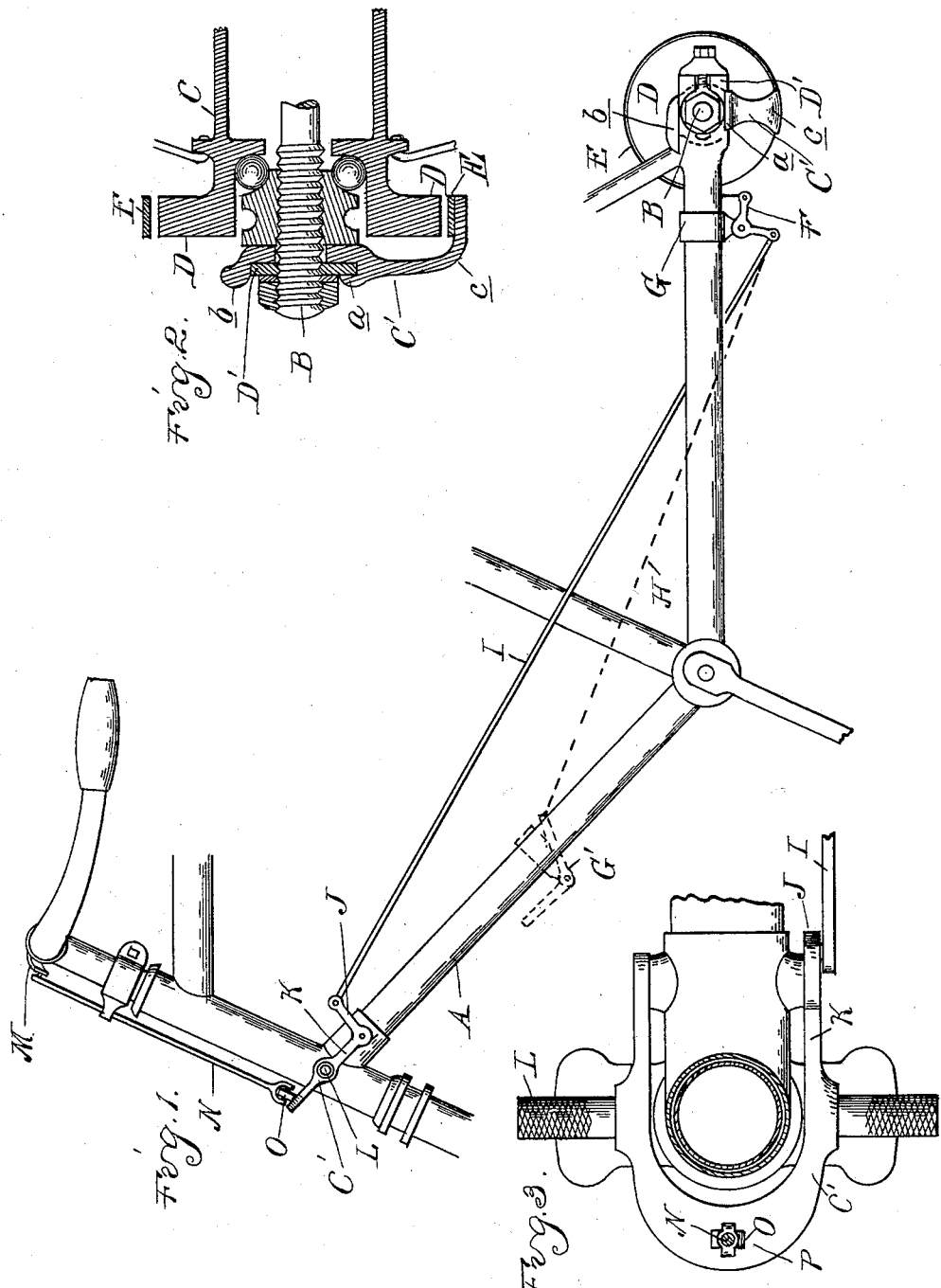
Witnesses
Otto F. Barthel
[signature]
Inventor
Erastus W. Hanes
By [signature]
Attys.
THE NORRIS PETERS CO., PHOTO-LITHO., WASHINGTON, D. C.

UNITED STATES PATENT OFFICE.

ERASTUS W. HANES, OF CANDOR, NEW YORK, ASSIGNOR TO WILLIAM J. PAYNE, OF SAME PLACE.

BICYCLE-BRAKE.

SPECIFICATION forming part of Letters Patent No. 609,742, dated August 23, 1898.

Application filed October 18, 1897. Serial No. 655,508. (No model.)

*To all whom it may concern:*

Be it known that I, ERASTUS W. HANES, a citizen of the United States, residing at Candor, in the county of Tioga and State of New York, have invented certain new and useful Improvements in Bicycle-Brakes, of which the following is a specification, reference being had therein to the accompanying drawings.

The invention consists in the construction of a brake for bicycles and other similar vehicles; and it consists particularly in a band-wheel formed integral with or secured to the driving-wheel, and a band-brake encircling the same, one end of the band is secured to a bracket which is applied as a washer on the rear axle, and the other end is secured to a suitable actuating-lever at the forward part of the machine.

The invention further consists in the construction and arrangement of the actuating-lever on or near the front fork, whereby the rider may conveniently and quickly apply the brake by his foot, and, further, whereby the ordinary hand-brake attachment may be used, if desired, for applying the brake, and, further, in the construction, arrangement, and combination of the various parts, all as more fully hereinafter described.

In the drawings, Figure 1 is a side elevation of a bicycle-frame or a portion thereof, showing my brake applied thereto. Fig. 2 is a vertical central section through the end of the hub of the rear wheel, showing the manner of applying the brake. Fig. 3 is a top plan view of an actuating-lever at the front of the machine.

I have shown my invention applied to the well-known safety-bicycle. It may be applied, however, to motor-vehicles, tricycles, &c., of similar character.

A is the bicycle-frame, and B is the shaft of the rear drive-wheel, C being the hub thereof, and D the band wheel or ring secured to the hub and forming a friction wheel or disk.

C' is a bracket which is apertured to permit of the passage therethrough of the rear axle and which is provided with a hooked flange $a$ and an overhanging flange $b$, adapted to engage upon opposite sides of the rear extension D' of the frame which supports the drive-wheel. This bracket therefore acts substantially as the washer which is ordinarily employed in bicycles at this place. The bracket is provided at its lower end with a bend or curved extension $c$, which extends across the face of the friction-disk D, as plainly shown in Fig. 2, the bearings or flanges $a$ $b$ having sufficiently long engagement with the frame of the bicycle to prevent angular or torsional movement of the bracket on the frame and when clamped in position by the clamping-nut on the rear axle will be held firmly against movement.

Secured to the extension $c$ of the bracket is the brake-strap E, which extends around the brake-wheel normally free therefrom, as shown in Fig. 1. At the other end this strap is connected to the bell-crank lever F, which is attached to a bracket or clip G, detachably clamped upon the reach of the bicycle or to any other suitable point of the frame. The bell-crank lever F is connected to the bell-crank lever G' by a connecting-rod, (shown in dotted lines at H.) The preferred construction of actuating device, however, is shown in full lines in the drawings, in which the connecting-rod I extends from the bell-crank lever F to a bell-crank lever J, secured to the reach at or near the steering-head of the machine, preferably slightly in rear thereof. The arm K of this bell-crank lever J is formed into yoke or V shape, as plainly shown in Fig. 3, so as to embrace the steering-head of the machine, and is pivoted on both sides thereof. Upon this yoke-shaped arm are the pins or ears L, which serve as supports for the foot of the rider, through which he may actuate the bell-crank lever with either foot or with both feet, as desired. This may be constructed, if desirable, so that the pins L may be used as coaster-pins or foot-rests in case the rider puts but little pressure thereon, and by applying pressure the brake will be set. This construction also permits of actuating the brake through the ordinary hand-lever M on the bicycle-handle, the connecting-rod N having an antifriction or roller bearing O at its lower end resting upon the flat segmental section P of this arm K of the forward bell-crank.

What I claim as my invention is—

In a bicycle-brake, the combination with a wheel, a frame comprising a fork member having the extension D', of a brake-rim on said wheel, a bracket having a substantially vertical portion provided with a hole and a substantially horizontal portion opposite said brake-rim, flanges or ribs on said vertical portion forming a substantially horizontal seat for said extension D', one of said flanges having an overhanging lip, a brake-band encircling said brake-rim and secured at one end to said horizontal portion of the bracket, a bell-crank lever secured to the frame to which the other end of said brake-band is connected, and operating means for said bell-crank lever.

In testimony whereof I affix my signature in presence of two witnesses.

ERASTUS W. HANES.

Witnesses:
BARTLEY COURSEN,
A. J. TORNILLIYES.